(12) United States Patent
Patterson et al.

(10) Patent No.: US 10,041,594 B2
(45) Date of Patent: Aug. 7, 2018

(54) ENERGIZED SCREW GLAND (71) Applicant: FORUM US, INC., Houston, TX (US)

(72) Inventors: Stephen Patterson, Kilbimie (GB);
Sohaib Anwer, Houston, TX (US);
Louis Leman, Montgomery, TX (US)

(73) Assignee: FORUM US, INC., Houston, TX (US)

( * ) Notice: Subject to any disclaimer, the term of this patent is extended or adjusted under 35 U.S.C. 154(b) by 255 days.

(21) Appl. No.: 14/570,907

(22) Filed: Dec. 15, 2014

(65) Prior Publication Data
US 2016/0169385 A1  Jun. 16, 2016

(51) Int. Cl.
F16J 1/00 (2006.01)
F16J 10/02 (2006.01)
F04B 53/16 (2006.01)
F16B 31/04 (2006.01)

(52) U.S. Cl.
CPC ............. *F16J 10/02* (2013.01); *F04B 53/16* (2013.01); *F16B 31/04* (2013.01); *F16J 1/008* (2013.01); *F16B 31/043* (2013.01)

(58) Field of Classification Search
CPC ....... F04B 53/164; F04B 53/22; F16B 31/043
USPC .................... 92/128, 130 A, 171.1
See application file for complete search history.

(56) References Cited

U.S. PATENT DOCUMENTS

| 3,841,193 | A | * | 10/1974 | Ito | F16B 31/043 411/395 |
|---|---|---|---|---|---|
| 3,870,439 | A | | 3/1975 | Stachowiak et al. | |
| 3,926,090 | A | * | 12/1975 | Bunker | F16B 37/0864 411/434 |
| 3,986,584 | A | * | 10/1976 | Wright | B61H 5/00 188/170 |
| 4,087,074 | A | * | 5/1978 | Massey | F15B 15/065 251/58 |
| 4,277,229 | A | | 7/1981 | Pacht | |
| 4,516,477 | A | * | 5/1985 | Lewis | F04B 53/00 417/454 |
| 4,569,506 | A | | 2/1986 | Vassalotti | |
| 4,723,352 | A | | 2/1988 | Connolly et al. | |
| 4,725,176 | A | | 2/1988 | Connolly et al. | |
| 4,729,158 | A | | 3/1988 | Williams | |
| 5,572,920 | A | | 11/1996 | Kennedy et al. | |
| 5,904,071 | A | | 5/1999 | Kennedy et al. | |

(Continued)

FOREIGN PATENT DOCUMENTS

DE  2512780 A1  10/1976
DE  3047674 A1  7/1982

(Continued)

OTHER PUBLICATIONS

International Search Report and Written Opinion dated Jul. 25, 2016 for PCT Application No. PCT/US2015/061793.

(Continued)

*Primary Examiner* — Michael Leslie
*Assistant Examiner* — Matthew Wiblin
(74) *Attorney, Agent, or Firm* — Patterson + Sheridan, L.L.P.

(57) ABSTRACT

A screw gland assembly that comprises a body having threads formed on an outer surface of the body. A piston retainer coupled to the body, and a piston disposed within the body. A biasing member disposed between the piston retainer and the piston such that the piston is moveable relative to the body against a bias force of the biasing member.

11 Claims, 6 Drawing Sheets

(56) References Cited

U.S. PATENT DOCUMENTS

| | | | |
|---|---|---|---|
| 6,209,445 B1* | 4/2001 | Roberts, Jr. | F04B 53/168 92/128 |
| RE37,483 E | 12/2001 | Kennedy et al. | |
| 6,929,287 B2 | 8/2005 | Flindall | |
| 7,234,388 B2 | 6/2007 | Orr et al. | |
| 7,287,460 B2 | 10/2007 | Riley et al. | |
| 7,367,789 B2* | 5/2008 | Raghavan | F04B 53/007 417/571 |
| 7,658,131 B1 | 2/2010 | Rosa et al. | |
| 7,748,310 B2 | 7/2010 | Kennedy | |
| 7,757,366 B2 | 7/2010 | Vorley et al. | |
| 8,186,263 B2 | 5/2012 | Kennedy | |
| 8,465,268 B2 | 6/2013 | Baxter et al. | |
| 8,616,590 B2 | 12/2013 | Travis et al. | |
| 9,188,146 B1 | 11/2015 | Trautman et al. | |
| 2007/0166121 A1* | 7/2007 | Mynhier | F16B 31/043 411/14.5 |
| 2012/0063936 A1 | 3/2012 | Baxter et al. | |
| 2012/0180280 A1 | 7/2012 | Psimas | |
| 2013/0263932 A1 | 10/2013 | Baxter et al. | |
| 2014/0083541 A1 | 3/2014 | Chandrasekaran et al. | |
| 2014/0245868 A1 | 9/2014 | Wagner et al. | |
| 2015/0101681 A1 | 4/2015 | Forrest et al. | |
| 2017/0107983 A1 | 4/2017 | Patterson et al. | |
| 2017/0334048 A1 | 11/2017 | Bartels et al. | |

FOREIGN PATENT DOCUMENTS

| | | |
|---|---|---|
| DE | 202006004050 U1 | 6/2006 |
| EP | 0222625 A1 | 5/1987 |
| EP | 1526281 A2 | 4/2005 |
| EP | 2687320 A2 | 1/2014 |
| EP | 3069827 A1 | 9/2016 |
| FR | 2560336 A1 | 8/1985 |
| GB | 2285489 A | 7/1995 |
| GB | 2295433 A | 5/1996 |
| WO | 2000/14406 A2 | 3/2000 |
| WO | 2004/106743 A1 | 12/2004 |

OTHER PUBLICATIONS

International Search Report and Written Opinion dated Dec. 19, 2016, corresponding to Application No. PCT/US2016/055951.

Great Britain Combined Search and Examination Report dated Jul. 28, 2017, corresponding to GB1704150.0.

International Search Report and Written Opinion dated Jun. 7, 2017, corresponding to Application No. PCT/US2017/021775.

International Search Report and Written Opinion dated Apr. 7, 2017, corresponding to Application No. PCT/US2016/064805.

* cited by examiner

ENERGIZED SCREW GLAND

BACKGROUND

Field of the Disclosure

Embodiments of the present disclosure generally relate to a screw gland.

Description of the Related Art

Multiplex reciprocating pumps are commonly used in the oil and gas industry. The pumps are used to pump fluids at high pressure into one or more wells that are drilled into the ground. The pumps have a fluid end through which the fluids flow, and a power end that drives the fluids through the fluid end. The internal and/or external components (e.g. screw glands, covers, valves, pistons, liners, seals, etc.) of the fluid end have to be replaced frequently because the fluids pumped through the fluid end are abrasive, corrosive, and/or are pumped at high pressures and flow rates, which wear out the fluid end components.

Installing and removing one or more fluid end components can be difficult due to spatial limitations and additional tools required for removal/installation. The fluid end may be confined next to other heavy machinery, such as the power end, which limits the amount of working space available. Installing and removing a screw gland of the fluid end for example, which requires using a long cheater bar, tommy bar, or C-spanner and a heavy hammer to rotate the screw gland, is difficult in such confined spaces. Also, impacting the long cheater bar, tommy bar, or C-spanner with the heavy hammer to rotate the screw gland of the fluid end, when combined with the limited amount of working space, increases safety hazard risks for the workers installing/removing the screw gland.

Therefore, there is a continuous need for new methods and apparatus of fluid end designs.

SUMMARY OF THE DISCLOSURE

In one embodiment, a screw gland assembly comprises a body having threads formed on an outer surface of the body; a piston retainer coupled to the body; a piston disposed within the body; and a biasing member disposed between the piston retainer and the piston, wherein the piston is moveable relative to the body against a bias force of the biasing member.

In one embodiment, a method of installing a screw gland comprises threading the screw gland into a body, wherein the screw gland comprises a piston that forms a chamber within a piston housing, and a biasing member that forces the piston to at least partially extend out of the piston housing; supplying pressurized fluid into the chamber to force the piston to at least partially retract into the piston housing and compress the biasing member; and releasing the pressurized fluid so that the biasing member forces the piston to at least partially extend out of the piston housing and compress a seal.

BRIEF DESCRIPTION OF THE DRAWINGS

So that the manner in which the above recited features can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Embodiments of this disclosure include a screw gland having a piston that is energized by a biasing member, such as a spring, to compress a seal within a fluid end. The screw gland has a threaded body that can be attached directly into a module of the fluid end or by utilizing an additional threaded adapter ring. A pressurized fluid acts on the piston to compress the biasing member, when the screw gland is threaded into the module of the fluid end module or the adapter ring. The pressurized fluid is then released so that the piston, energized by the biasing member, applies a constant force onto a plug, which compresses the seal that is disposed within the module of the fluid end. The screw gland allows access into the module of the fluid end but also maintains the seal within the fluid end to prevent leaks during operation.

Figure 1:
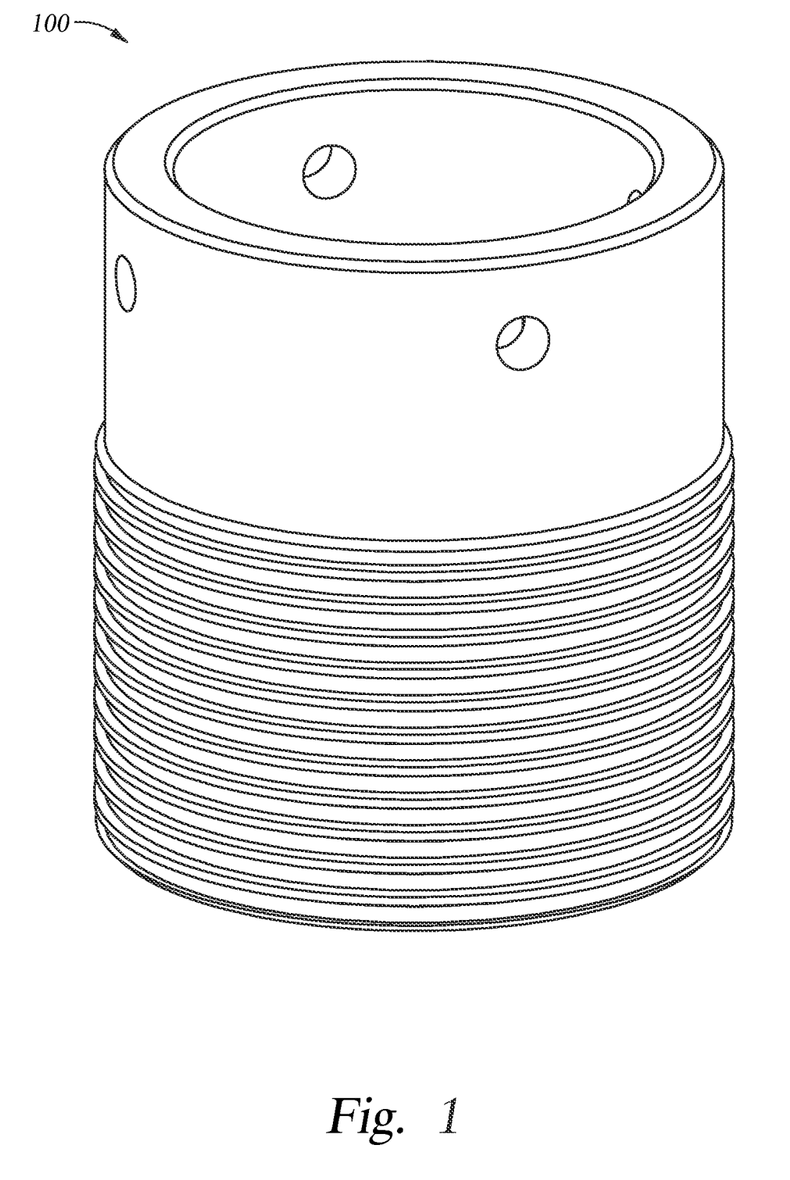
FIG. 1 illustrates a screw gland, according to one embodiment disclosed herein.

FIG. 1 illustrates a screw gland 100 for use with a fluid end of a multiplex reciprocating pump. Examples of a multiplex reciprocating pump and a fluid end that can be used with the embodiments disclosed herein are described in U.S. Patent Application Publication No. 2013/0263932, filed on Mar. 15, 2013, the contents of which are herein incorporated by reference in its entirety. Although the screw gland 100 is described herein as a component of a fluid end, the screw gland 100 can be used with other types of equipment.

Figure 2A:
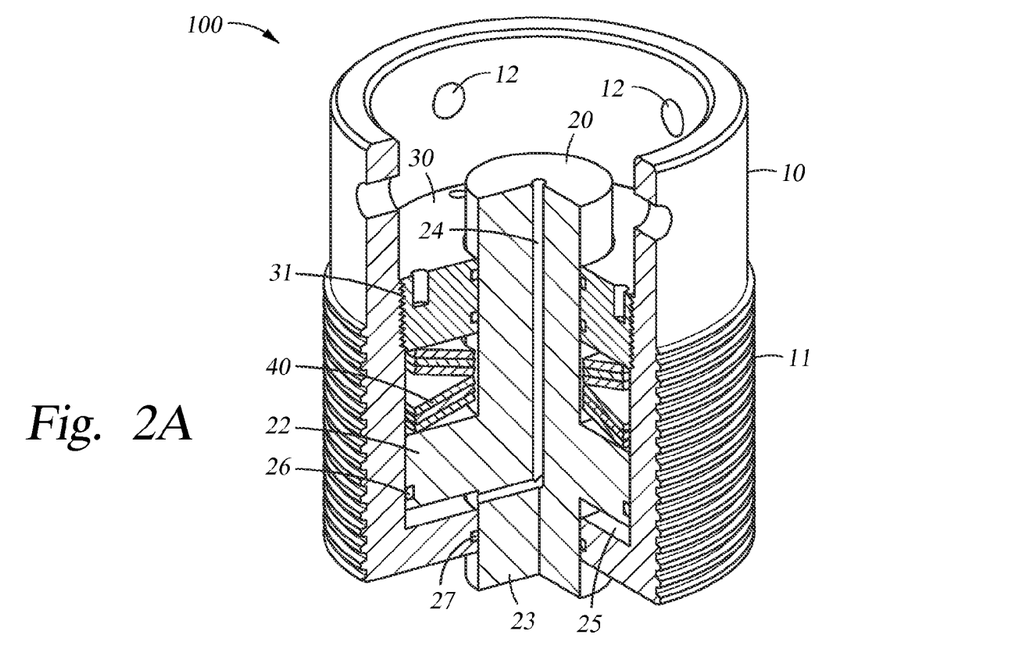
FIG. 2A and FIG. 2B illustrate a sectional view of the screw gland in an un-actuated position, according to one embodiment disclosed herein.
Figure 2B:
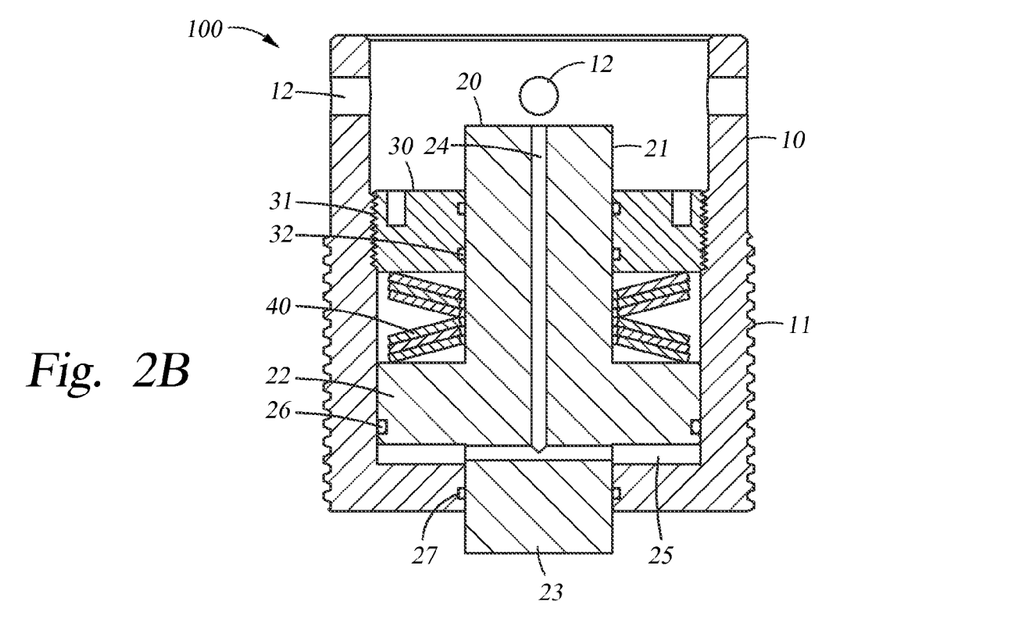

FIG. 2A and FIG. 2B illustrate a sectional view of the screw gland 100 in an un-actuated position. The screw gland 100 includes a body 10 having threads 11 formed on an outer surface of the body 10, and one or more openings 12 formed through the body 10. The screw gland 100 can be threaded via the threads 11 directly into a module of a fluid end or directly into a threaded adapter ring to retain a plug and a seal within a bore of the module, as further illustrated in FIG. 4A-4C. A tool, such as a cheater bar, a tommy bar, or a C-spanner, can be inserted through one or more of the openings 12 to help rotate the screw gland 100 into a thread engagement.

The screw gland 100 further includes a piston 20 that is retained within a bore of the body 10 by a piston retainer 30. The body 10 acts as a piston housing for the piston 20. The piston retainer 30 is threaded into engagement with threads 31 formed on the inner surface of the body 10. One or more seals 32 are disposed between the piston retainer 30 and a retainer end 21 of the piston 20 that at least partially extends through the piston retainer 30.

According to one embodiment, the piston 20 may include the retainer end 21, a middle portion 22, and a plug end 23. The retainer end 21 at least partially extends through a bore of the piston retainer 30. The middle portion 22 has an outer diameter that is greater than an outer diameter of the retainer end 21, and is located below the piston retainer 30 within the body 10. The plug end 23 at least partially extends through a bore in an end of the body 10, or through a bore in an additional piston retainer that is coupled to the end of the body 10.

A chamber 25 is formed between the middle portion 22 of the piston 20 and the end of the body 10. One or more seals 26 are disposed between the outer surface of the middle portion 22 of the piston 20 and the inner surface of the body 10. One or more seals 27 are disposed between the outer surface of the plug end 23 of the piston 20 and the inner surface of the body 10. The chamber 25 is sealed by the seals 26, 27. In one embodiment, a second piston retainer may be threaded into engagement with the end of the body 10 (below the middle portion 22 of the piston 20) to retain the piston 20 within the body 10 from below.

A fluid path 24 is formed through the piston 20 to supply fluid into the chamber 25 to pressurize the chamber 25. A pressure fitting may be coupled to the retainer end 21 of the piston 20 to supply pressurized fluid into the fluid path 24 and the chamber 25. When the chamber 25 is pressurized, the piston 20 is forced to at least partially retract into the body 10 against a bias force of one or more biasing members 40, such as springs, that are disposed between the piston retainer 30 and the middle portion 22 of the piston 20. When the chamber 25 is pressurized to a pressure sufficient to generate a force on the piston 20 that is greater than the bias force of the biasing member 40, the piston 20 is at least partially retracted into the body 10 to compress the biasing member 40. The biasing member 40 may be any device that stores energy and is able to force the piston 40 to at least partially extend out of the body 10 when the energy is released. For example, the biasing member 40 may be a mechanical device, such as a spring, and/or a compressible fluid, such as a gas.

Figure 3A:
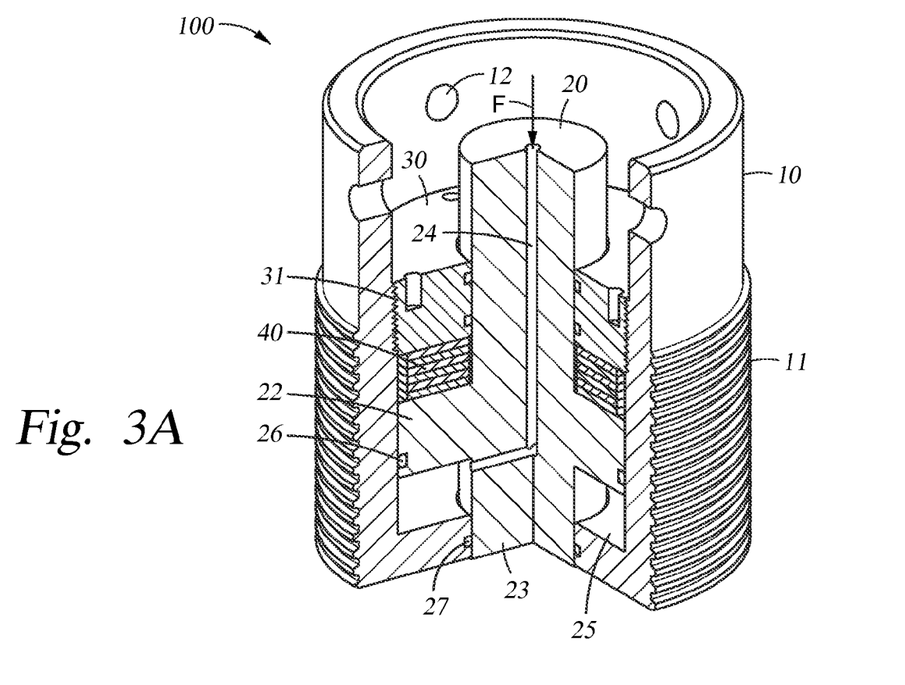
FIG. 3A and FIG. 3B illustrate a sectional view of the screw gland in an actuated position, according to one embodiment disclosed herein.
Figure 3B:
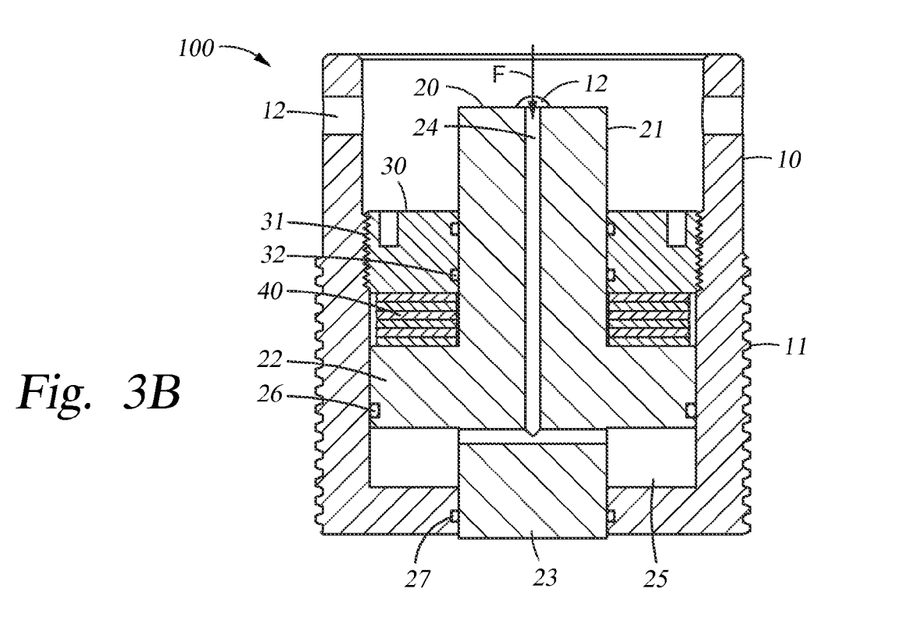

FIG. 3A and FIG. 3B illustrate a sectional view of the screw gland 100 in an actuated position. A pressurized fluid (identified by reference arrow "F") is supplied into the chamber 25 via fluid path 24 at a pressure sufficient to generate a force on the piston 20 that is greater than the bias force of the biasing member 40. The seals 26, 27 seal the pressurized fluid within the chamber 25. The piston 20 is at least partially retracted into the body 10 relative to the piston retainer 30. The retainer end 21 of the piston 20 moves through the bore of the piston retainer 30. The biasing member 40 is compressed between the piston retainer 30 and the middle portion 22 of the piston 20.

As illustrated in FIG. 3B, when the screw gland 100 is in the second operational position, the plug end 23 of the piston 20 may at least partially extend out of and beyond the end of the body 10. Alternatively, when the screw gland 100 is in the actuated position, the plug end 23 of the piston 20 may be recessed or flush with the end of the body 10. After the pressurized fluid within the chamber 25 is released and/or generates a force on the piston 20 that is less than the bias force of the biasing member 40, then the biasing member 40 moves the piston 20 to at least partially extend out of the body 10 and back into the un-actuated position as illustrated in FIG. 2B, or creates a retention force on the piston 20 when installed in a fluid end as illustrated and described with respect to FIGS. 4A, 4B, and 4C.

Figure 4A:
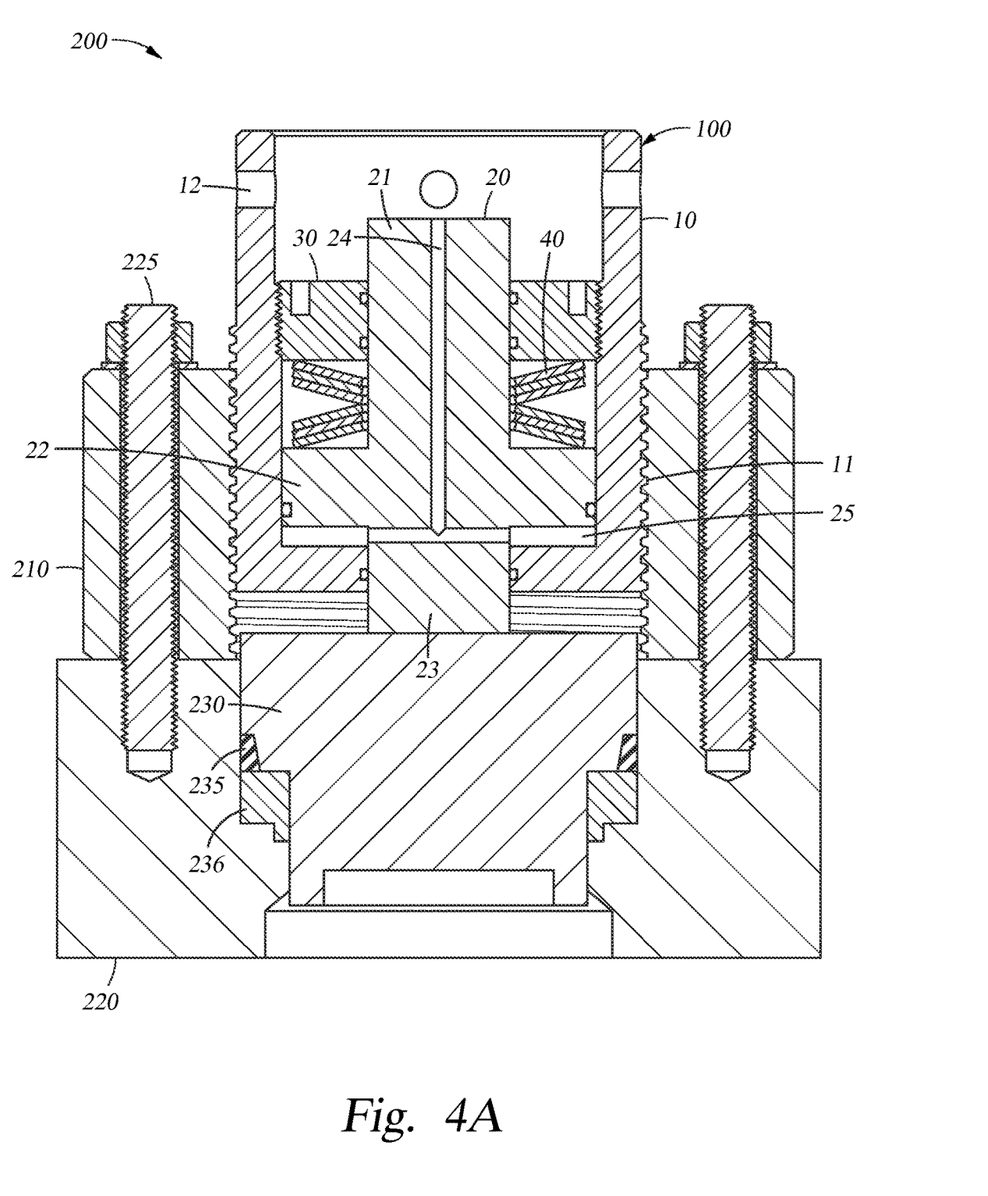
FIG. 4A, FIG. 4B, and FIG. 4C illustrate an installation process for the screw gland, according to one embodiment disclosed herein.
Figure 4B:
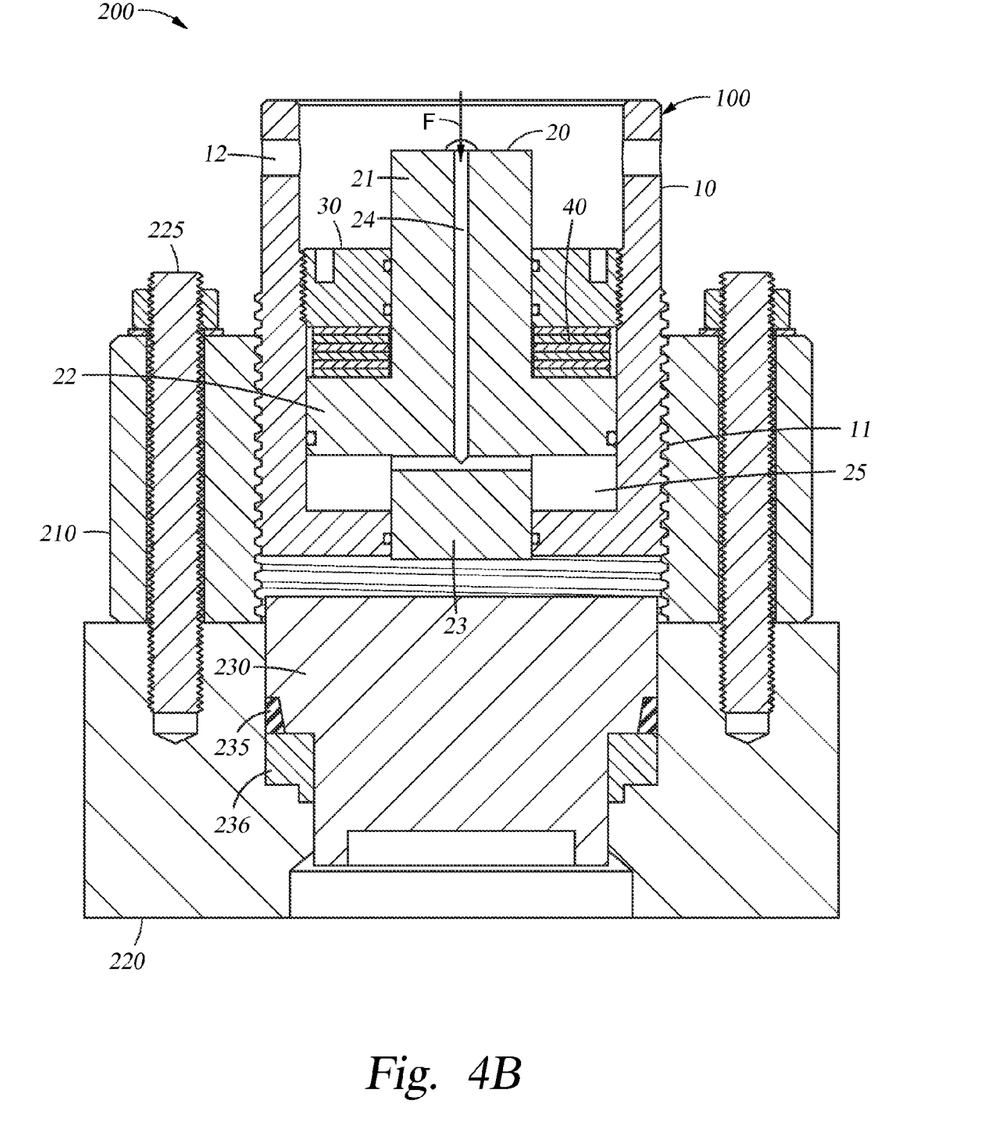
Figure 4C:
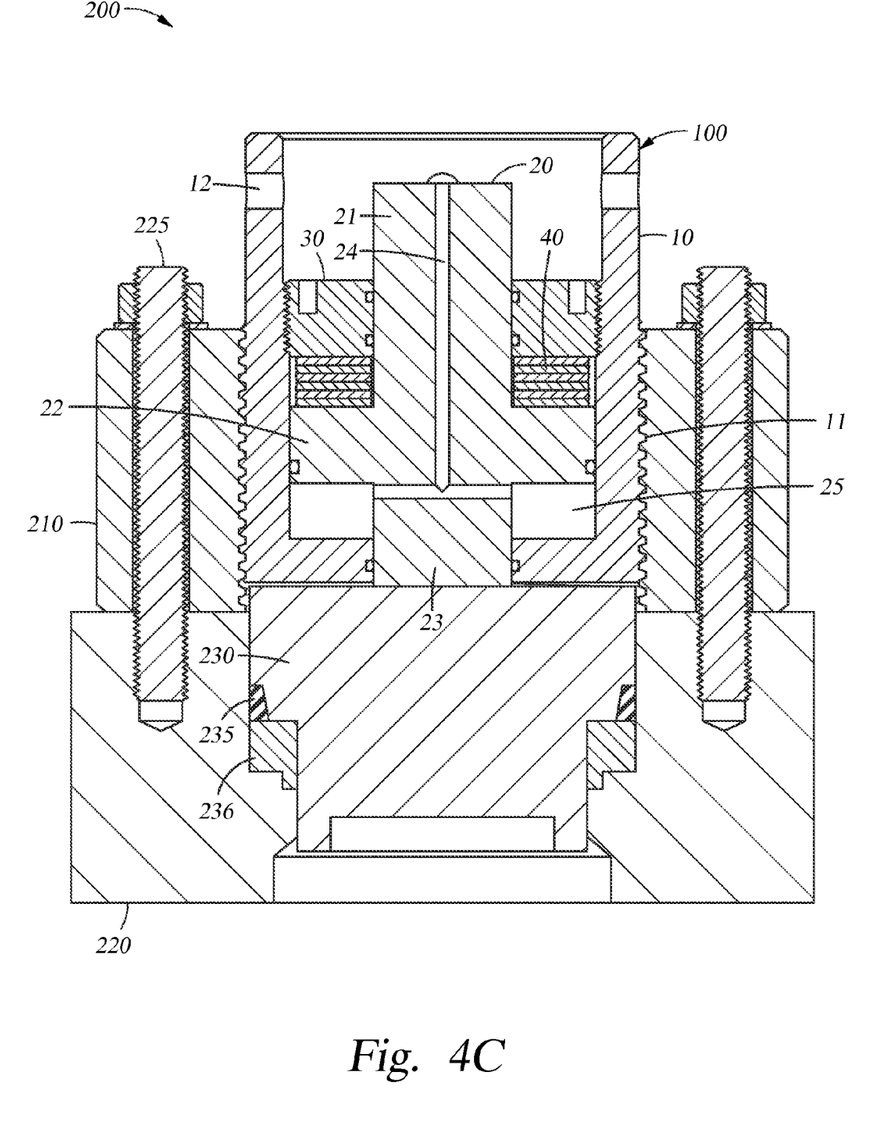

FIG. 4A, FIG. 4B, and FIG. 4C illustrate a process for installing the screw gland 100 of a fluid end 200, according to one embodiment. Referring to FIG. 4A, the fluid end 200 includes a threaded adapter ring 210 that is coupled to a module 220 by one or more bolts 225. The screw gland 100 may be threaded directly into the threaded adapter ring 210, or alternatively directly into the module 220 without the need for the threaded adapter ring 210. The threaded adapter ring 210 and/or the module 220 may include a body having one or more internal bores. For example, the body of the module 220 may be formed by a forged and/or cast metallic and/or ceramic material.

The screw gland 100 retains a plug 230 and a seal 235 within the module 220. The seal 235 is compressed by the plug 230 via the screw gland 100 to hold internal pressure within the module 220 when pressurized and to prevent fluid from leaking out across the seal 235 through the end of the module 220. The screw gland 100, the plug 230, and the seal 235 can all be removed to provide access to additional components (e.g. valves, pistons, liners, seals, etc.), such as component 236, disposed within the module 220. In one embodiment, the plug 230 may be coupled to or integrally formed with the piston 20 of the screw gland 100.

Once the plug 230 and the seal 235 are positioned within the module 220, and the threaded adapter ring 210 is bolted to the module 220, then the body 10 of the screw gland 100 can be threaded into a threaded bore of the threaded adapter ring 210. The screw gland 100 is threaded via threads 11 into the threaded adapter ring 210 at least partially and/or until the plug end 23 of the piston 20 contacts the plug 230 as illustrated in FIG. 4A. The screw gland 100 may be threaded into the threaded adapter ring 210 such that the plug end 23 of the piston 20 applies a force onto the plug 230 to compress the seal 235 and retain these components with the module 220.

Specifically, the piston retainer 30 is moved with the body 10 as the body 10 is threaded into the threaded adapter ring 210. The piston retainer 30 retains the biasing member 40, which forces the piston 20 to at least partially extend out of the body 10 against the plug 230. When the piston 20 can no longer be moved against the plug 230, then the biasing member 40 may begin to be compressed between the piston retainer 30 and the middle portion 22 of the piston 20 as the body 10 is further threaded into the threaded adapter ring 210. The screw gland 100 may only be hand tightened to a point where an additional force is needed to fully compress the biasing member 40. Alternatively, the screw gland 100 may only be partially threaded into the threaded adapter ring 210 to a position where the plug end 23 of the piston 20 does not contact the plug 230 prior to pressurizing the screw gland 100 as further described below.

Referring to FIG. 4B, a pressurized fluid (identified by reference arrow "F") is supplied into the chamber 25 via the fluid path 24. The pressurized fluid forces the piston 20 to at least partially retract into the body 10 against the bias force of the biasing member 40 to compress the biasing member 40. The pressurized fluid is supplied at a pressure sufficient to generate a force on the piston 20 that compresses the biasing member 40 between the middle portion 22 of the piston 20 and the piston retainer 30. When the piston 20 is at least partially retracted into the body 10, a gap is formed between the plug end 23 of the piston 20 and the plug 230.

Referring to FIG. 4C, while the chamber 25 is pressurized, the body 10 is further threaded into the threaded adapter ring 210 (such as by hand tightening or by using additional tooling such as a tommy bar or C-spanner) until the plug end 23 of the piston 20 contacts the plug 230. After the piston 20 contacts the plug 230, the pressurized fluid can be released from the chamber 25 and/or the pressure within the chamber 25 can be reduced so that the biasing member 40 creates a retention force on the piston 20 that forces the piston 20 to at least partially extend out of the body 10 against the plug 230 to compress the seal 235 to form a seal with the module 220. In this manner, the plug 230 and the seal 235 are held within the module 220 by the force produced by the biasing member 40 acting on the piston 20 against the plug 230. In addition, the threaded engagement of the body 10 in the threaded adapter ring 210 provides a back-up retention mechanism in the event of a failure of the piston 20, the piston retainer 30, and/or the biasing member 40.

In an alternative method of installation, pressurized fluid may be supplied to the chamber 25 to force the piston 20 to compress the biasing member 40, e.g. the screw gland 100 may be moved into the actuated position, before the screw gland 100 is threaded into the threaded adapter ring 210 or directly into the module 220. The screw gland 100 (when in the actuated position as illustrated in FIG. 3A and FIG. 3B) can then be threaded into the threaded adapter ring 210 until the plug end 23 of the piston 20 contacts the plug 230 or until the piston 20 is close to but not yet contacting the plug 230. After, the pressurized fluid can be released from the chamber 25 and/or the pressure within the chamber 25 can be reduced so that the biasing member 40 creates a retention force on the piston 20 that forces the piston 20 to at least partially extend out of the body 10 against the plug 230 to compress the seal 235 to form a seal with the module 220.

To remove the screw gland 100 from the threaded adapter ring 210, the installation process described in FIGS. 4A-4C and above can be repeated in reverse order. Pressurized fluid may be supplied into the chamber 25 to force the piston 20 to at least partially retract into the body 10, and then the body 10 can be unscrewed manually (by hand and/or by using additional tooling such as a tommy bar or C-spanner) from the threaded adapter ring 210. The pressurized fluid can be released from the chamber 25 before the body 10 is completely unthreaded from the threaded adapter ring 210. Alternatively, the body 10 can be unscrewed with or without supplying pressurized fluid into the chamber 25.

One advantage of the screw gland 100 is an increase in worker safety by eliminating the need for heavy (sledge) hammers during installation and removal. Another advantage of the screw gland 100 is a reduction of the installation and removal time by utilizing a bias member force rather than a manual force. Another advantage of the screw gland 100 is that in the event of a failure of the piston 20, the piston retainer 30, and/or the biasing member 40, the screw gland 100 still has the original functionality of manual tightening by inserting a cheater bar, a tommy bar, or a C-spanner into the openings 12 and impacting with a heavy hammer. Another advantage is that the screw gland 100 can be used with existing fluid end designs simply by replacing prior OEM screw glands with the screw gland 100 described herein.

While the foregoing is directed to certain embodiments, other and further embodiments may be devised without departing from the basic scope thereof, and the scope thereof is determined by the claims that follow.

The invention claimed is:

1. A screw gland assembly, comprising:
   a body having threads formed on an outer surface of the body;
   a piston retainer coupled to the body;
   a piston having a retainer end, a middle portion, and a plug end opposite the retainer end, wherein the piston is at least partially disposed within the body such that the retainer end extends through and out of the piston retainer and the plug end extends through and out of the body; and
   a biasing member disposed between the piston retainer and the middle portion of the piston, wherein the piston is moveable relative to the body against a bias force of the biasing member.

2. The assembly of claim 1, wherein the middle portion has an outer diameter greater than an outer diameter of the retainer and plug ends of the piston.

3. The assembly of claim 1, wherein the plug end of the piston at least partially extends through a bore located at an end of the body.

4. The assembly of claim 3, wherein a chamber is formed between the middle portion of the piston and the end of the body.

5. The assembly of claim 4, wherein the piston comprises a fluid path in fluid communication with the chamber.

6. The assembly of claim 5, wherein pressurized fluid is supplied into the chamber via the fluid path to generate a force on the piston sufficient to compress the biasing member.

7. The assembly of claim 1, wherein the biasing member is a mechanical device or a compressible fluid.

8. A fluid end, comprising:
   the screw gland assembly of claim 1;
   a module;
   a threaded adapter ring coupled to the module; and
   a plug disposed within the module, wherein the body of the screw gland is threaded into engagement with the threaded adapter ring such that the piston is forced into contact with the plug by the biasing member.

9. The assembly of claim 1, wherein the piston retainer is coupled to the body by being threaded into engagement with threads formed on an inner surface of the body.

10. The assembly of claim 1, wherein the body has one or more openings formed through the body and located on a far side of the threads from the plug end, wherein the openings are configured to receive a tool to help rotate the screw gland assembly.

11. The assembly of claim 1, wherein the piston comprises a fluid path disposed longitudinally through a center of the retainer end and the middle portion, and disposed transversely through the plug end.

\* \* \* \* \*